United States Patent Office 3,586,567
Patented June 22, 1971

3,586,567
PROCESS OF PRODUCING FOAM SHEET STRUCTURES
Joseph Henry Ryan, Wilmington, Del., assignor to E. I. du Pont de Nemours and Company, Wilmington, Del.
No Drawing. Filed Aug. 5, 1968, Ser. No. 750,002
Int. Cl. C09j 5/00
U.S. Cl. 156—306                   5 Claims

ABSTRACT OF THE DISCLOSURE

Process for heat-bonding a stack of thin foam sheets by passing a heated gas parallel to the plane of the sheets therethrough.

BACKGROUND OF THE INVENTION

Relatively thick foamed structures of various substances such as polystyrene and polyurethane are well-known in the art and can be formed directly by usual sheet forming processes. However, some low density foams, due to their method of manufacture, are available only in a relatively thin sheet form. Since certain of these foams exhibit exceptionally high durability, it is often desirable to form thicker foamed structures by lamination of several thin layers of the low density foam.

Lamination of thin layers of low density foam is usually accomplished by stacking several layers of the foam together, applying pressure with a platen type press, and heating the stack of sheets to a temperature which is above the bonding temperature of the foam but below that at which the foam undergoes cellular collapse. The heat is usually supplied through the platens of the press.

The application of this process has heretofore been somewhat limited, however, since the foam sheets provide a relatively high degree of thermal insulation, and long periods of time are necessary for a thick stack of foam sheets to be completely heated to the bonding temperature.

SUMMARY OF THE INVENTION

The process of the instant invention provides a method for bonding a large number of foam sheets in a relatively short period of time. Specifically, the instant invention provides an improvement in the process for the preparation of foam sheet structures comprising stacking a plurality of thermoplastic foam sheets having an irregular surface and heating the stack above the bonding temperature of the foam but below the melting point of the foam structure, the improvement which comprises heating the stack of foam sheets by passing a current of heated air between the individual foam sheets. Preferably, the foam sheets are stacked so that their machine direction axes are in alignment, and the air is passed through the stack parallel to the machine direction axes.

DESCRIPTION OF THE PREFERRED EMBODIMENTS

The process of the instant invention is applicable to most foam sheets of thermoplastic resins having an irregular surface; that is, having a surface roughness ratio of at least 1.1.

For this purpose,

Surface roughness ratio
$$= \frac{\text{thickness of foam sheet under a 0.1 p.s.i. flat plate}}{\text{thickness of foam sheet calculated from water displacement volume}}$$

It is generally most economical, however, to use this method only for those foams which are unavailable in the desired thickness by usual casting or extrusion techniques. Such foams generally include thermoplastic crystalline polymer foams having a work-to-break value of at least 10,000 inch pounds per cubic inch, the foam comprising polyhedral closed cells. Preferred foams include those having cells of at least 500 microns in median diameter and having a maximum density of about 0.03 gram per cc. Foam sheets which are especially suitable for the process of the instant invention are composed of isotactic polypropylenes and linear polyethylenes. Those sheets prepared according to the process described in copending, coassigned application Ser. No. 664,781, hereby incorporated by reference, are particularly preferred, since the surface of these foam sheets is characterized by channels or grooves running in the machine direction of the sheet, making these foam sheets particularly suitable for a gas to flow through the unbonded laminar structure.

The individual foam sheets are placed together in a stack of the approximate desired final thickness or somewhat in excess of the final thickness. The benefits of the process of the instant invention are realized to an increasing degree with an increasing thickness of the stack of films to be bonded, since the insulating value of the film stack increases with an increase in the thickness of the stack, and the effectiveness of a heat source in the platen press would be correspondingly diminished. Preferably, the individual sheets are stacked so as to have alignment of the machine direction axes throughout the stack of sheets.

Only sufficient pressure need be applied to retain the stack of sheets so that they will not be dispersed by the heated gas flow. If it is desired to provide a structure of reduced thickness or one free of the machine direction surface chanels of the individual sheets, positive pressure can be applied after the heating cycle for a short period of time, e.g., about 15 seconds. For those isotactic polypropylene and linear polyethylene foams prepared according to the process described in copending application Ser. No. 664,781, for example, a pressure up to about 5 pounds per square inch is generally satisfactory.

The air used to flow through the stacked structure is heated to a temperature at or above the bonding temperature of the individual plies of foam but below the temperature at which the foam undergoes cellular collapse. Generally, these requirements are satisfied by heating the air to a temperature about from 5° to 35° C. below the melting point of the foam. For those foam sheets prepared in the aforementioned copending application, a temperature of about from 140° to 170° C. is sufficient to bond the individual layers together.

The aid can be forced under pressure in any direction parallel to the plane of the individual foam sheets. However, it has been found particularly effective to pass the heated gas through the stacked foam structures along the machine direction axis. The pressure at which the heated air should be supplied varies according to the size of the irregularities in the surface of the foam being bonded and the dimensions of the stack of foam sheets to be treated; that is, according to the distance that the heated air has to travel. Generally, however, the instant process can be carried out with air supplied at a pressure of about from 1 to 5 pounds per square inch for foamed structures of less than 3 feet square. For many structures provision of heated air by a simple fan-type blower is satisfactory.

The process of the instant invention is further illustrated by the following specific examples.

EXAMPLE 1

A stack of 20 sheets of 1/16 inch polypropylene foam is assembled, aligning the individual sheets along the machine direction axis. The individual foam sheets are prepared according to Example 1 of copending application Ser. No. 664,781. The assembled stack is placed in an unheated nine by twelve inch platen press set to a clearance of 1¼ inch. A stream of air, heated to 150° C., is forced through the stack in the machine direction of the individual sheets using a blower fan delivering air at 1700 f.p.m. After 15 seconds the air is turned off, and the platens brought to a 1-inch separation, exerting a pressure of about 4 p.s.i. on the stack. After 5 seconds, the stack is removed from the press and allowed to cool. The individual plies are firmly bonded into a single composite.

EXAMPLE 2.—COMPARATIVE EXAMPLE

Example 1 is repeated, except that the heat is supplied through the platens of the press instead of the stream of air and the platen clearance is continuously maintained at 1 inch. The stack of foam sheets becomes well bonded only after a period of 3 minutes' heating with the platens at a temperature of 150° C.

I claim:
1. In the process for the preparation of foam sheet structures comprising stacking more than two thermoplastic foam sheets having an irregular surface, and heating the stack above the bonding temperature of the foam but below the melting point of the foam structure, the improvement which comprises heating the stack of foam sheets by passing a current of heated air parallel to the plane of the sheets between the individual foam sheets.

2. A process of claim 1 wherein the air is supplied at a pressure of about from 1 to 5 pounds per square inch.

3. A process of claim 1 wherein the temperature of the air is maintained at a temperature of about from 5° to 35° C. below the melting point of the foam sheet.

4. A process of claim 1 wherein the sheets are stacked with their machine direction axes substantially aligned and the heated air is passed parallel to the machine direction axes.

5. A process for the preparation of laminar polypropylene foam sheets comprising stacking a plurality of thin polypropylene sheets having a surface roughness ratio of at least 1.1, with their machine direction axes in substantial alignment, passing a current of air which is heated to a temperature of about from 140° to 170° C. through the stack, substantially parallel to the machine direction axis, and applying a pressure of up to 5 pounds per square inch to the stack.

References Cited

UNITED STATES PATENTS

| | | | |
|---|---|---|---|
| 2,957,793 | 10/1960 | Dickey | 156—497 |
| 3,084,489 | 4/1963 | Seefluth | 156—497 |
| 3,210,227 | 10/1965 | Shichman | 156—82 |
| 3,226,278 | 12/1965 | Scofield, Sr., et al. | 156—497 |
| 3,278,358 | 10/1966 | Rosewicz et al. | 156—497 |
| 3,380,229 | 4/1968 | Nelson | 156—497 |
| 3,488,244 | 1/1970 | Lepisto | 156—499 |

REUBEN EPSTEIN, Primary Examiner

U.S. Cl. X.R.

156—497